United States Patent
Rutz et al.

(10) Patent No.: US 11,327,044 B2
(45) Date of Patent: May 10, 2022

(54) ELECTROCHEMICAL SENSOR

(71) Applicant: Mettler-Toledo GmbH, Greifensee (CH)

(72) Inventors: Andreas Rutz, Zürich (CH); Juan Limon Petersen, Zürich (CH)

(73) Assignee: Mettler-Toledo GmbH, Greifensee (CH)

( * ) Notice: Subject to any disclaimer, the term of this patent is extended or adjusted under 35 U.S.C. 154(b) by 344 days.

(21) Appl. No.: 16/466,125

(22) PCT Filed: Dec. 8, 2017

(86) PCT No.: PCT/EP2017/081993
§ 371 (c)(1),
(2) Date: Jun. 3, 2019

(87) PCT Pub. No.: WO2018/104510
PCT Pub. Date: Jun. 14, 2018

(65) Prior Publication Data
US 2020/0064306 A1 Feb. 27, 2020

(30) Foreign Application Priority Data

Dec. 9, 2016 (EP) ..................................... 16203103

(51) Int. Cl.
*G01N 27/32* (2006.01)
*G01N 27/36* (2006.01)
(Continued)

(52) U.S. Cl.
CPC .......... *G01N 27/414* (2013.01); *G01N 27/302* (2013.01); *G01N 27/36* (2013.01); *G01N 27/4167* (2013.01)

(58) Field of Classification Search
CPC .............................. G01N 27/36; G01N 27/302
See application file for complete search history.

(56) References Cited

U.S. PATENT DOCUMENTS 4,376,681 A * 3/1983 Inoue ................. G01N 27/4162
204/415
4,988,418 A * 1/1991 Beck .................... G01N 27/416
205/780

(Continued)

FOREIGN PATENT DOCUMENTS

DE  102009001632 A1   9/2010
DE  102012111811 A1   6/2014
(Continued)

OTHER PUBLICATIONS

EPO computer-generated English language translation of EP 1729121 A1, patent published Dec. 6, 2006 (Year: 2006).*
(Continued)

*Primary Examiner* — Alexander S Noguerola
(74) *Attorney, Agent, or Firm* — Standley Law Group LLP; Jeffrey S. Standley; Stephen L. Grant (57) ABSTRACT

An electrochemical sensor (1, 101) has a sensor element (15, 115) with a measuring surface (8, 108) that faces a measuring medium (5) during use. The sensor element has a planar measuring element (2, 102). A sensor shaft (4, 104) has an aperture (13, 113) with a bezel (11, 111) at an end which, during use, faces the measuring medium. The sensor element is installed in the area of the aperture. The electrochemical sensor also has an annular sealing element (9, 109), which is arranged between the sensor element and the bezel. An insulator element (10, 110) is firmly and inseparably connected to the measuring element, exposing or recessing the measuring surface. Thus, the sealing element, which protects the electrochemical sensor against the ingress of measuring medium, is arranged sealingly between the insulator element and the bezel.

12 Claims, 4 Drawing Sheets

(51) Int. Cl.
    *G01N 27/414*    (2006.01)
    *G01N 27/30*     (2006.01)
    *G01N 27/416*    (2006.01)

(56) References Cited

U.S. PATENT DOCUMENTS

| | | | | |
|---|---|---|---|---|
| 5,244,562 | A * | 9/1993 | Russell | A61B 5/14532 |
| | | | | 204/403.06 |
| 5,565,076 | A * | 10/1996 | Topping | G01N 27/333 |
| | | | | 204/416 |
| 6,464,940 | B1 | 10/2002 | Akioka et al. | |
| 7,241,369 | B2 | 7/2007 | Van Hoorn | |
| 8,197,651 | B2 * | 6/2012 | Nishio | G01N 27/36 |
| | | | | 204/420 |
| 2012/0241320 | A1 * | 9/2012 | Carpenter | G01N 27/36 |
| | | | | 204/416 |

FOREIGN PATENT DOCUMENTS

| | | | | |
|---|---|---|---|---|
| EP | 1729121 | A1 | 12/2006 | |
| JP | 61-79154 | A | 4/1986 | |
| JP | 61-120958 | A | 6/1986 | |
| JP | 02151754 | A * | 6/1990 | G01N 27/30 |

OTHER PUBLICATIONS

EPO computer-generated English language translation of EP 1396718 A1, patent published Mar. 10, 2004 (Year: 2004).*
EPO computer-generated English language translation of JP 02151754 A, patent published Jun. 11, 1990 (Year: 1990).*

* cited by examiner

ELECTROCHEMICAL SENSOR

The invention relates to an electrochemical sensor and a method for manufacturing it. In particular, the invention relates to the structure of a sensor in an area, which is in contact with the measuring medium, when using the electrochemical sensor.

Conventional electrochemical or potentiometric sensors, in particular those that measure the pH value of a measuring medium, are designed as so called glass electrodes. These usually have a glass shaft with an end, which is facing or immersed in the measuring medium during use, and to which end of the glass shaft an approximately spherical or hemispherical electrochemically active pH glass membrane is firmly connected, i.e., fused, as a measuring element. The measuring rod formed in this way is filled with a buffer solution. Depending on the pH value of the measuring medium, a potential differential forms across the glass membrane, which is measured as a reference point by a metal electrode immersed in the buffer solution as a conductor element relative to the equilibrium potential of a reference electrode.

Furthermore, so called ion-sensitive field-effect-transistor sensors (ISFET) are known, wherein the pH value of a measuring medium or the concentration of a certain ion, for which the sensor has a sensitive layer, is measured by changing the source-drain current of the transistor.

In contrast to conventional potentiometric sensors, the ISFET sensor has as its sensitive area a largely level or planar measuring element facing the measuring medium during use.

U.S. Pat. No. 6,464,940 B1 describes the design, manufacturing and measuring principle of a pH measuring cell, which is designed to determine minute volumes of a measuring medium, i.e. the size of a drop. As a reservoir for the measuring medium, an annular wall of Pyrex glass is arranged on an insulator layer applied to a semiconductor substrate and coated with a metal electrode, such that the latter may contact the measuring medium. The surface of the substrate facing the reservoir is likewise coated with a metal electrode. Thus, at a frequency of around 1 MHz, a capacitance-voltage characteristic can be measured between the electrode in contact with the measuring medium during use, and an electrode mounted on the rear of the semiconductor substrate, which characteristic varies depending on the pH value of the measuring medium.

Even though the manufacturing of conventional electrochemical glass sensors is complex and the glass-measuring cells need to be produced individually, they nevertheless have a high sensitivity and long-term stability, whereas the manufacturing of ISFET-sensors or sensors with a flat or planar measuring element, as disclosed in U.S. Pat. No. 6,464,940 B1, can be done on a large scale using wafer technology. However, as for their stability and resistance to aggressive media, ISFET-sensors do not achieve the same values inherent in electrochemical glass sensors. Compared with electrochemical glass sensors, ISFET sensors have less favorable drift stability and are less suitable in terms of process-measuring technology.

Electrochemical sensors, whose measuring element, e.g., the pH-sensitive glass membrane in electrochemical glass sensors, is designed as a planar measuring element, are therefore desirable, in that sensor elements comprising such a measuring element can be produced on a large scale using wafer technology.

It has been shown that measuring errors can occur in an electrochemical sensor with a planar measuring element, and which in connection with a sensor element is installed in a sensor shaft, if a sealing element, which prevents the penetration of medium—usually a measuring or cleaning medium—is positioned directly on the measuring surface of the measuring element during use. Such measurement errors may occur in the form of a reduced slope or a long response time, i.e., the stability and reproducibility of the electrochemical sensor could be compromised.

The objective of the invention is to propose an electrochemical sensor with a delimited area in terms of size and/or areal extent, i.e., a precisely defined measuring surface. Thus, if the sensor is immersed in a measuring or cleaning medium during use, the measuring element of the sensor has a precisely defined surface contacting the medium, while at the same time providing a good seal between the sensor and the measuring or cleaning medium.

This objective is achieved by an electrochemical sensor according to claim 1 and a manufacturing method for the electrochemical sensor according to claim 11, including installation of a sensor element in a sensor shaft. Advantageous embodiments are explained in the dependent claims.

An electrochemical sensor comprises a sensor element with a measuring surface facing a measuring medium during use, which sensor element comprises a planar measuring element. Furthermore, the electrochemical sensor is provided with a sensor shaft, which has an aperture with a bezel at its end facing, during use, the measuring medium, and in which sensor shaft, the sensor element is installed in the area of the aperture. The electrochemical sensor comprises an annular sealing element, which is arranged between the sensor element and the bezel. An insulator element is firmly and inseparably connected to the measuring element of the sensor element, leaving the measuring surface exposed or recessed. The sealing element, which protects the sensor against the ingress of measuring medium, is sealingly arranged between the insulator element and the bezel.

In this context, a planar measuring element is understood to be a substrate with on one side a flat sensitive area forming a measuring surface, e.g., in the form of a sensitive layer as a sensitive material, or a disc-shaped measuring element made of a sensitive material, which element is largely flat on either side.

An insulator element consisting of insulating material forms a joint structure with the measuring element of the electrochemical sensor according to the invention, i.e., it is inseparably connected therewith.

The measuring element and the insulator element are not necessarily per se homogeneous. They may also be multi-layered, e.g., the measuring element may comprise one or more sensitive layers.

The measuring element and the insulator element form the sensor element, optionally including other elements needed for the operation of the electrochemical sensor, but which are not covered by the invention.

A sealing element is used to seal the inside of the sensor shaft of the electrochemical sensor against a measuring or cleaning medium, whereby one end of the sensor is immersed during use. The sealing element has a chemically and thermally stable polymer or elastomeric material.

The area facing the measuring environment of the sensor and contacting the measuring medium during use is understood to be the exposed area or recess of a measuring surface of the measuring element.

The design of an electrochemical sensor according to the invention allows for large-scale manufacturing of the sensor element, as well as a shape suitable for installation in a sensor shaft by using wafer technology. In particular, the insulator element, which is inseparably connected with the measuring element in the area of contact with the measuring medium, ensures a measuring surface, which is precisely defined in terms of its extent and which is in contact with the measuring medium during use, i.e., a medium-contacting surface. Furthermore, the insulator element along with the annular sealing element provides a good seal by preventing measuring medium from entering between the sealing element and the measuring surface. The final result is an improved sensor slope and increased long-term stability.

In a further embodiment, the sensor element of the electrochemical sensor according to the invention comprises, as its measuring element, a flat, planar disc of electrochemically active pH glass. However, the measuring element may also be designed as a layer or a layer structure comprising a flat electrochemically active pH glass.

In an advantageous development of the electrochemical sensor, the insulator element comprises a thermally and chemically resistant insulator glass, whose thermal expansion coefficient is adapted to that of the measuring element, and in particular is identical to the thermal expansion coefficient of the measuring element. An identical coefficient of expansion is understood here to be one, which has a deviation of less than $5e^{-7}/K$ between the insulator glass and pH glass.

Alternatively, the insulator element may comprise an insulator layer, in particular of silicon nitride, applied by means of a physical or chemical deposition process. In this case, due to the small layer thickness of such an insulator layer, the thermal expansion coefficient of the insulator element needs not correspond with that of the measuring element.

In a further embodiment, the sensor shaft is cylindrical and the aperture and thus the exposed area or the recess are arranged on the end face of the sensor shaft. Consequently, an easily handled electrochemical sensor is formed.

In a further embodiment, the sensor shaft is cylindrical and the aperture arranged in a flattened area of the cylinder jacket of the sensor shaft.

Depending on the arrangement of the aperture and hence the exposed area and/or recess on the end face or in a flattened area of the cylinder jacket of the sensor shaft, the measuring surface of the measuring element may be shaped differently. It may be circular, elliptical or rectangular. The requirement of a measuring surface to be larger than a circular measuring surface, as generally is the case for a sensor element installed on the end face of a sensor shaft, may favor an elliptical or rectangular shape of the measuring surface. However, it is always a requirement that the exposed surface is slightly smaller than the sealing surface in order to avoid direct contact between the seal and the active measuring surface.

The embodiment of an inventive electrochemical sensor, wherein the sensor shaft is made of a thermally and chemically resistant metallic material or plastic, makes possible a robust, largely unbreakable electrochemical sensor, which may also be used in a harsh chemical environment and is autoclavable.

The method for manufacturing an electrochemical sensor according to the invention with a flat sensitive measuring surface facing a measuring medium during use comprises the following steps:

Manufacturing of an inseparable bond of a wafer comprising a sensitive material with an insulator material to form at least a two-layered wafer;

Generating a predefined thickness by processing the sensitive material and if applicable, the insulator material bonded thereto;

Structuring the insulator material while exposing a measuring surface in the sensitive material in order to form one or more measuring elements;

Cutting the at least two-layered wafer of bonded sensitive material and structured insulator material in the areas of the existing insulator material into sensor elements provided with insulator elements;

Installation of a thus-produced sensor element in a shaft, whereby a sealing element is sealingly introduced between the insulator element and a bezel at the end of the sensor shaft facing the measuring medium during use.

This method allows for large-scale manufacturing of the sensor elements and provides a low-cost electrochemical sensor.

In an advantageous embodiment of the method, the sensitive material has an electrochemically active pH glass, and the insulator material has a thermally and chemically resistant insulator glass with a thermal expansion coefficient adapted to the sensitive material, in particular an identical thermal expansion coefficient, wherein the insulator material is inseparably bonded to the sensitive material by means of "direct bonding" or "fusion bonding" in order to form at least a two-layered wafer.

In an alternative embodiment of the method, the insulator material comprises an insulator layer, in particular made of silicon nitride, which is applied to the sensitive material by means of a physical or chemical deposition process, bonded therewith to form an at least two-layered wafer, and subsequently structured. In a further alternative, the insulator layer applied by means of a physical or chemical deposition process may be produced in a structured manner directly by using a screen during deposition in the form of insulator elements.

The structuring of the insulator material on the sensitive material may advantageously be performed by an etching technique, in particular wet-chemically with hydrofluoric acid or by plasma etching.

The invention is explained below with reference to the highly schematic drawings. In the drawings.

The invention will be described below by way of example with reference to a pH sensor having a sensor element with a flat measuring surface, e.g., electrochemically active pH glass. However, the invention also comprises further electrochemical sensors, with a flat sensor element serving as a substrate, e.g., a semiconductor element, as disclosed in U.S. Pat. No. 6,464,940 B1, or an ISFET element.

It should be noted at this point that the individual components of the various embodiments of electrochemical sensors are not drawn to scale in the following figures.

Figure 1:
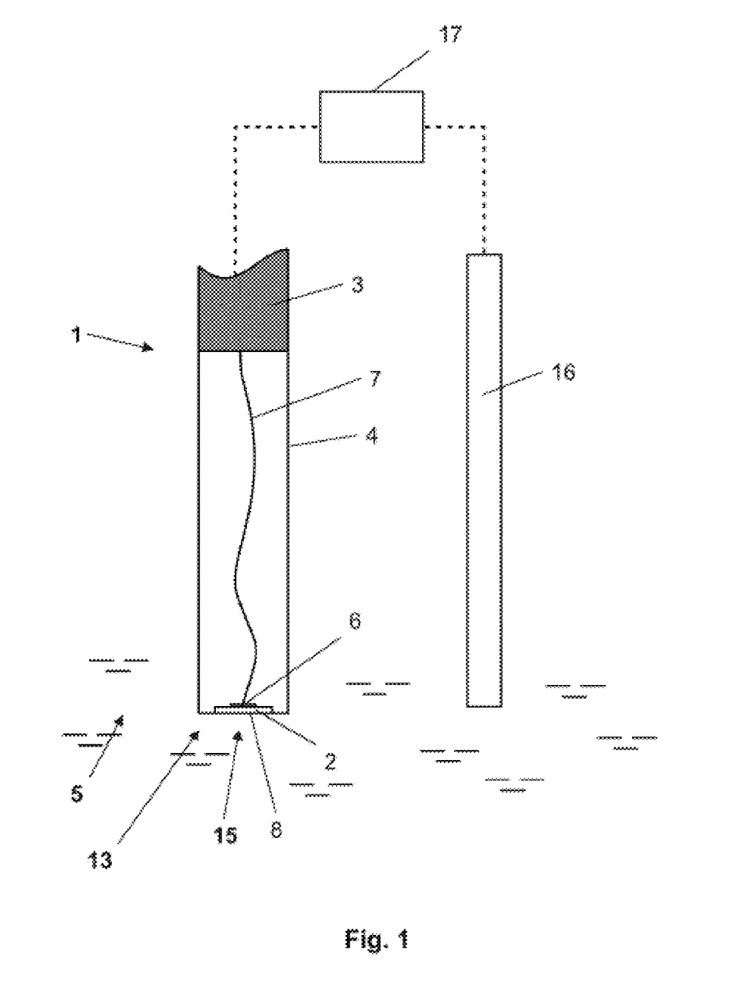
FIG. 1 Is a general view of an electrochemical sensor in the form of a pH-measuring rod with a reference electrode FIG. 2 Is a partial view of an electrochemical sensor in the form of a pH-measuring rod with a sensor element installed in the sensor shaft in a first embodiment.

FIG. 1 shows an electrochemical sensor 1 in a highly schematic representation. The electrochemical sensor 1 shown forms a measuring rod, which is used in connection with a reference electrode 16 to determine the pH of a measuring medium. The sensor 1 and the reference electrode 16 are connected to a transmitter 17 via a wire (shown in the figure as a dashed line)

The electrochemical sensor 1 has an aperture 13 at its end facing downward in the figure, wherein a sensor element 15 is arranged. The sensor element 15 comprises a measuring element 2 and has, e.g., a planar layer, i.e., a flat surface or membrane made of electrochemically active pH glass. Alternatively, measuring element 2 may also comprise a flat pane of pH glass on either side. The sensor element 15 is installed in a sensor shaft 4. During use, the electrochemical sensor 1 is partially immersed in a measuring medium 5, i.e., at least in the area comprising the aperture 13 with the sensor element 15, whereby a measuring surface 8 of the measuring element 2, forming a surface in contact with the medium, faces the measuring medium 5. At its end opposite the sensor element 16, the electrochemical sensor 1 has a sensor head 3, which contains a portion of the sensor electronics. The latter is connected to a contact 6 via a wire 7 for the transmission of a measurement signal. Inside the sensor shaft 4, further assemblies may be arranged on the sensor element 15, which assemblies serve to acquire the measurement signal. However, these are not the subject of the present invention and will therefore not be considered further below.

Figure 2:
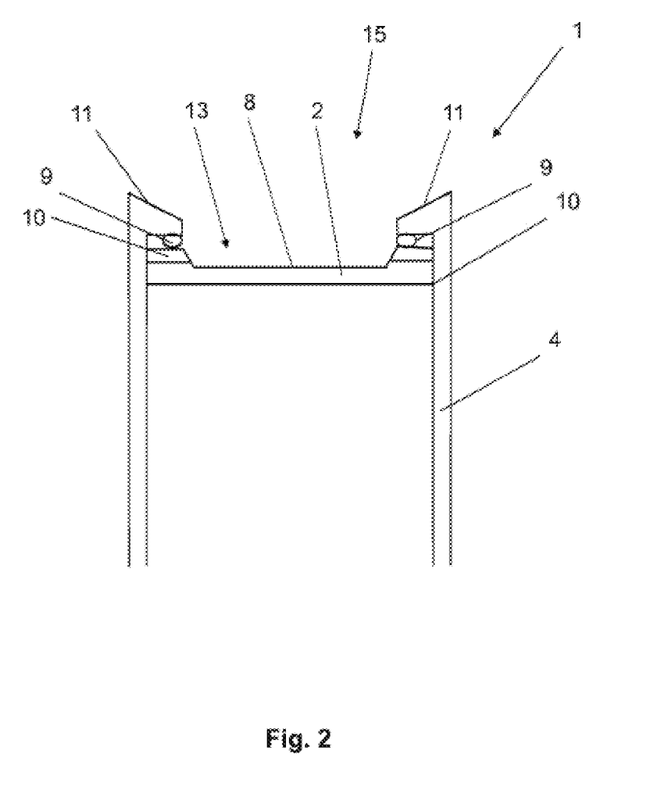

FIG. 2 shows a partial sectional view of the end of the electrochemical sensor 1 facing the measuring medium 5 during use (see FIG. 1). The sensor element 15 installed in the sensor shaft 4 may either be a measuring element 2 made of electrochemically active pH glass, or a sensor element as described in U.S. Pat. No. 6,464,940 B1, or an ISFET sensor, and the like. It is crucial that the surface of the measuring element 2 in contact with the medium be planar. Advantageously, the measuring element 2 is designed as a flat disc. The electrochemical sensor 1 is sealed against the measuring medium 5 by an elastic sealing element 9. The sealing element 9 may preferably be formed as a sealing ring with a round or flat profile made of a chemically and thermally stable polymer, such as PTFE (polytetrafluoroethylene), or an elastomer, in particular a perfluoroelastomer (FFKM). The sealing element 9 may preferably be used as a sealing ring with a round or flat profile of a chemically and thermally stable polymer, such as PTFE (polytetrafluoroethylene), or an elastomer, in particular a perfluoroelastomer (FFKM). Notwithstanding its circular shape, such a sealing ring may also assume other shapes, such as elliptical or rectangular.

Between the sealing element 9 and the measuring surface 8 of the electrochemical sensor 1, which is in contact with the measuring medium 5 during use, an insulator element 10, which is connected inseparably with the measuring element 2, is arranged. This insulator element 10 has a structure with an exposed area in the measuring surface 8 of the measuring element 2 in contact with the medium during use, which exposed area has a precisely defined geometrical extent. In the arrangement shown in FIG. 2, the insulator element 10 is preferably annular, and thus forms a circular exposed area of the measuring surface 8 of measuring element 2. The insulator element 10 is connected inseparably to the measuring element 2 using the so-called wafer-bonding process, also known as direct bonding or fusion bonding. This bonding process is sufficiently well-known from MEMS packaging and the microfluidics field, and will not be further described here.

In the case of a pH sensor with a planar measuring element 2, the insulator element is made of electrochemically active pH glass from a material of the same type, i.e., insulating glass, with a thermoelectric coefficient of thermal expansion adapted to the coefficient of thermal expansion of the pH glass, in particular substantially the same coefficient of thermoelectric expansion. Given the inseparable connection between the material of the measuring element, i.e., the sensitive material, and the material of the insulator element, i.e., the insulator material, the sensor is made of at least a 2-layered wafer material.

The sensor shaft 4 is preferably made of a metal, e.g., stainless steel, titanium, or of a chemically and thermally stable hard polymer material, e.g., PEEK, PVDF or PFA (perfluoroalkoxy) or a comparable fluoropolymer, or optionally of a composite material. At its end immersed in the measuring medium during use, it has a bezel 11 extending toward the inside of the shaft. The dimensions of the sensor shaft 4 may be, e.g., 12 mm in diameter, 1 mm for the wall thickness, and the bezel 11 may extend over approx. 1 mm toward the inside of the shaft. Naturally, electrochemical sensors with different dimensions may also be produced.

The sealing element 9 is arranged sealingly between the bezel 11 and the insulator element 10, i.e., the polymer or elastomer ring is slightly deformed due to the pressure between the bezel 11 and the insulator element 10 to ensure the tightness of the electrochemical measuring probe 1 at its end, which is immersed in the measuring or cleaning medium during use.

As the sealing element 9 rests completely on the insulator element 10, rather than directly on the measuring element 2, it is prevented that measuring medium is present between the measuring surface 8 and the elastic sealing element 9, even in the case of a full sealing effect, which would give rise to an undefined measuring surface 8. The solution according to the invention thus provides a precisely defined measuring surface 8 within its extent without the interference of edge effects and/or exchange effects in the sealing area.

As an alternative to an insulator element 10, which is made of an insulating, non-sensitive glass and with a coefficient of thermal expansion adapted to the measuring element 2 of electrochemically active pH glass, the insulator element 10 may also be formed by a layer produced by physical or chemical deposition processes, e.g., of silicon nitride. Due to the usual silicon nitride layer thicknesses of about 0.1 to 0.5 micrometers, there is no need here for adjusting the thermal expansion coefficients of electrochemically active pH glass of measuring element 2 and insulator element 10. Other insulator materials, e.g., silicon oxide, aluminum oxide, and the like, may also be considered as additional materials for insulator elements applied in this fashion. Also conceivable are coatings of chemically and thermally stable polymer materials.

Figure 3A:
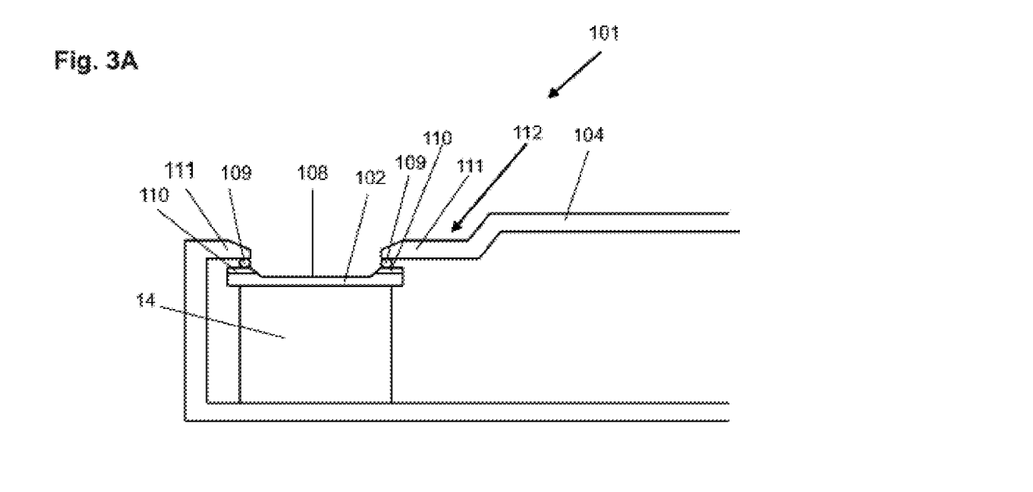
FIG. 3A Is a partial view of a further embodiment of an electrochemical sensor in the form of a pH-measuring rod with a sensor element installed in the sensor shaft.
Figure 3B:
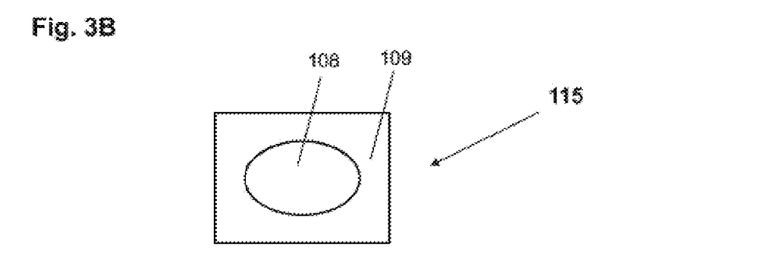
FIG. 3B Is a measuring element of a sensor element connected to an insulator element according to FIG. 3A.

FIGS. 3A and 3B represent partial views of a further embodiment of an electrochemical sensor 101, with a sensor element 115 installed in the sensor shaft 104, i.e., FIG. 3A in a sectional drawing along shows the sensor shaft 104 and FIG. 3B shows the measuring element 102 connected to the isolator element 110 in plan view.

In this embodiment, the sensor shaft 104 has a flattened area 112 with an aperture 113 on one side of its end facing the measuring medium 5 during use, wherein the sensor element 115 is arranged. This sensor element 115, which is installed in the side wall of the sensor shaft 104 by means of a fixture device 14, may have a measuring element 102 with a shape other than a circular shape, e.g., oval or rectangular with rounded corners, or the like. This embodiment enables the presence of a larger measuring surface 108 compared with the design shown in FIG. 2, where the sensor element 2 is installed transversely relative to the cylinder axis of the sensor shaft 4.

Moreover, in the design shown in FIGS. 3A and 3B, an insulator element 110, which is inseparably connected to the measuring element 102, is arranged between the sealing element 109 and the measuring surface 108 in contact with the measuring medium 5. The corresponding isolator element 110 may, in this embodiment, be formed as an oval ring or, as shown in FIG. 3B, also cover the whole edge area of the measuring element 102, except for the oval-shaped exposed area of the measuring surface 108. It is important that the sealing element 109 rests completely on the insulator element 110, and that the measuring surface 108 resulting from the exposed area is precisely defined in terms of its size or extent.

Figure 4:
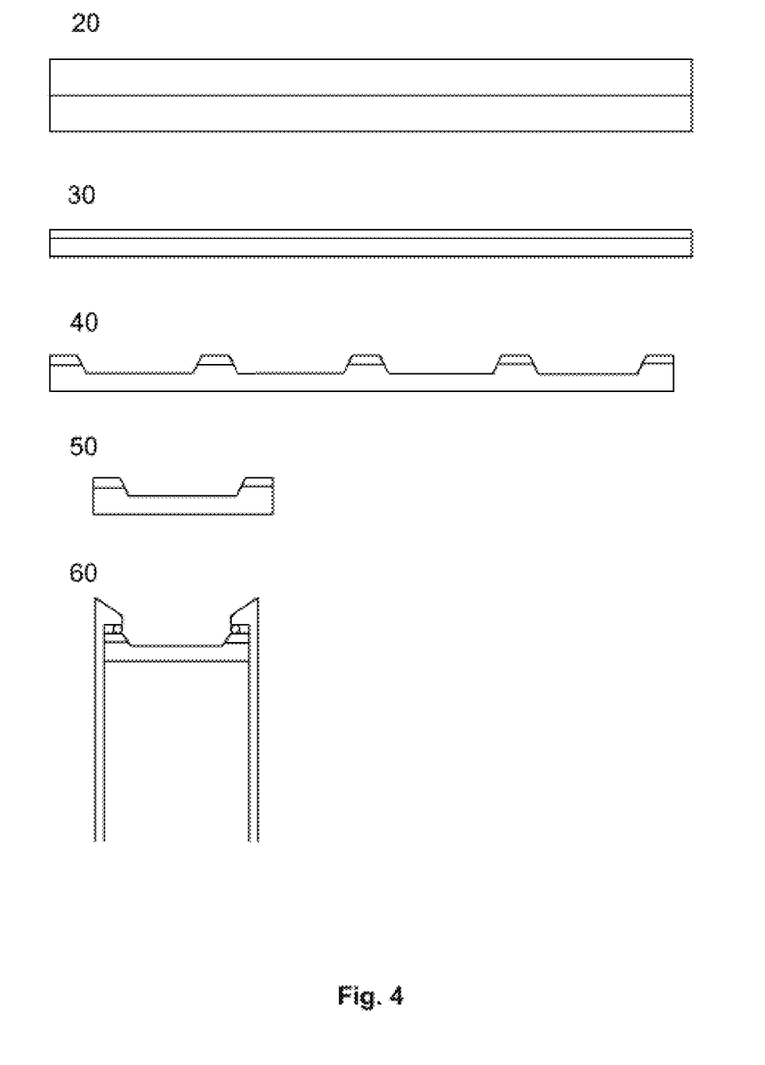
FIG. 4 The steps of producing and installing a sensor element in a sensor shaft.

FIG. 4 illustrates by way of example the steps for producing and installing the sensor element 15 in the sensor shaft 4 in the embodiment of an electrochemical sensor according to FIG. 2, and an insulator element 10 made of chemically and thermally stable insulator glass connected with the measuring element 2 by means of wafer technology. In step 20, a wafer of about 50 to 100 mm in diameter made of electrochemically active pH glass with a thickness of 0.3 mm to 1.2 mm, preferably 0.6 mm, is connected by direct or fusion bonding to a wafer of equal size made of chemically and thermally stable insulator glass with an adjusted, in particular identical, coefficient of thermal expansion. The mentioned methods of so-called wafer bonding are known and therefore not described in detail.

After forming such an inseparably connected, at least two-layered wafer from measuring element 2 and insulator element 10, the thickness of both layers of the wafer is reduced in step 30 by grinding and subsequent polishing to about 0.1 mm for the insulator glass and about 0.1 to 0.2 mm for the pH glass.

Subsequently, the insulator glass is structured in step 40 by means of wet chemical etching, a dry-etching or a mechanical process, such as powder blasting or fluid-jet polishing and using screens, wherein an exposed area of the pH glass is created in defined areas, thus forming precisely defined measuring surfaces 8 for the respective measuring elements 2 on the at least two-layered wafer. At the same time, the insulator glass remains in the edge areas in order to form the insulator elements 10 as a component following separation of the sensor elements 15.

In step 50, the separation to individual form sensor elements 15 with the associated isolator elements takes place. They are preferably cut, e.g., by means of laser or diamond cutting, and if applicable ground into a suitable shape. Cutting takes place in the areas of existing insulator material and in a shape suitable for installation in a sensor shaft 4, e.g., circular for a sensor according to FIG. 2, or rectangular for a sensor according to FIG. 3B.

A sensor element 15 is installed in a sensor shaft 4 in step 60, optionally after further processing or the addition of further components needed for establishing sensor 1 operability, such that when using a sensor 1 immersed in a measuring medium 5, the insulator element 10 faces the measuring medium 5. Thus, a sealing element 9 is arranged sealingly between a bezel 11 and insulator element 10, i.e., the sensor element 15 with the measuring element 2 and the insulator element 10 is fastened by applying controlled pressure on a fixture device 14 in the interior (see FIG. 3A) of the sensor shaft 4.

The manufacturing of a sensor, which as an insulator element has a layer produced by a physical or chemical deposition process, e.g., a silicon nitride layer, is performed in an analogous manner. The coating process is preferably PECVD (plasma enhanced chemical vapor deposition). The etching process for producing the exposed area is done by plasma etching.

Alternatively, the areas of the exposed area could also already be covered by screens on the wafer of a sensitive material, and the insulator material—in this case, silicon nitride—could be (vapor-) deposited similarly structured, e.g., by PVD (physical vapor deposition).

The invention was disclosed and described with reference to preferred embodiments. However, the scope of protection shall also include other embodiments and developments of the invention, which are not described in detail here. For example, when structuring the insulator material of the wafer, different patterns in the exposed area, e.g., islands and the like, may conceivably be created.

LIST OF REFERENCE NUMERALS

1, 101 Electrochemical sensor
2, 102 Measuring element
3 Sensor head
4, 104 Sensor shaft
5 Measuring medium
6 Contact
7 Wire
8, 108 Measuring surface
9, 109 Sealing element
10, 110 Insulator element
11, 111 Bezel
112 Flattened area of the sensor shaft 104
13, 113 Aperture
14 Fixture device
15, 115 Sensor element
16 Reference electrode
17 Transmitter
20 Wafer bonding
30 Wafer thickness adjustment
40 Structuring
50 Separation
60 Installation

The invention claimed is:
1. An electrochemical sensor, comprising:
a sensor shaft having an end that faces a measuring medium during use, the sensor shaft comprising an aperture with a bezel;
a sensor element, installed in the area of the aperture, having a planar measuring element which is a substrate with, on one side, a flat sensitive area forming a measuring surface, with an exposed area or recess of the measuring surface facing and contacting the measurement medium during use and an insulator element that is firmly and inseparably connected to the measuring element to precisely define an extent of the measuring surface; and
an annular sealing element arranged between the insulator element and the bezel to protect the electrochemical sensor against the ingress of measuring medium, whereby the insulator element along with the annular sealing element provides a good seal by preventing measuring medium from entering between the sealing element and the measuring surface.

2. The electrochemical sensor of claim 1, wherein the measuring element comprises a flat, planar disc of electrochemically active pH glass.

3. The electrochemical sensor of claim 1, wherein the measuring element comprises a flat, planar layer or layer structure comprising electrochemically active pH glass.

4. The electrochemical sensor of claim 1, wherein the insulator element comprises a thermally and chemically resistant insulator glass, the thermal expansion coefficient of which is adapted to that of the measuring element.

5. The electrochemical sensor of claim 4, wherein the thermal expansion coefficient of the insulator element is substantially identical to the thermal expansion coefficient of the measuring element.

6. The electrochemical sensor of claim 1, wherein the insulator element comprises an insulator layer, applied by means of physical or chemical deposition processes.

7. The electrochemical sensor of claim 6, wherein the insulator layer comprises silicon nitride.

8. The electrochemical sensor of claim 1, wherein the sensor shaft is cylindrical, and the aperture is arranged on an end face thereof.

9. The electrochemical sensor of claim 1, wherein the sensor shaft is cylindrical, and the aperture is arranged in a flattened area of the cylinder jacket thereof.

10. The electrochemical sensor of claim 9, wherein the measuring surface of the measuring element is of a circular or elliptical or rectangular shape.

11. The electrochemical sensor of claim 1, wherein the sensor shaft is made of thermally and chemically resistant metallic material or a thermally and chemically resistant plastic material.

12. The electrochemical sensor of claim 11, wherein the sealing element comprises a ring of elastic polymeric material or an elastomer.

* * * * *